(12) United States Patent
Young

(10) Patent No.: US 7,356,179 B2
(45) Date of Patent: Apr. 8, 2008

(54) COLOUR CODE ASSISTED IMAGE MATCHING METHOD

(75) Inventor: Philippe Georges Young, Exeter (GB)

(73) Assignee: Simpleware Ltd., Exeter, Devon (GB)

( * ) Notice: Subject to any disclaimer, the term of this patent is extended or adjusted under 35 U.S.C. 154(b) by 468 days.

(21) Appl. No.: 10/501,182

(22) PCT Filed: Jan. 13, 2003

(86) PCT No.: PCT/GB03/00081

§ 371 (c)(1),
(2), (4) Date: Feb. 11, 2005

(87) PCT Pub. No.: WO03/065295

PCT Pub. Date: Aug. 7, 2003

(65) Prior Publication Data

US 2005/0175237 A1    Aug. 11, 2005

(30) Foreign Application Priority Data

Jan. 29, 2002    (GB)    ................... 0202033.7

(51) Int. Cl.
*G06K 9/00*    (2006.01)
(52) U.S. Cl. ..................................... 382/164
(58) Field of Classification Search .................... None
See application file for complete search history.

(56) References Cited

U.S. PATENT DOCUMENTS

| | | | | |
|---|---|---|---|---|
| 5,048,109 A | * | 9/1991 | Bloomberg et al. | 382/164 |
| 5,579,407 A | | 11/1996 | Murez | |
| 6,035,059 A | * | 3/2000 | Kurosawa et al. | 382/164 |
| 6,057,858 A | * | 5/2000 | Desrosiers | 345/467 |
| 2002/0012462 A1 | * | 1/2002 | Fujiwara | 382/165 |

FOREIGN PATENT DOCUMENTS

| | | |
|---|---|---|
| EP | 0 618 545 A | 10/1994 |
| JP | 11-224258 | 8/1999 |

OTHER PUBLICATIONS

Patent Abstracts of Japan, vol. 016, No. 003, Jan. 7, 1992 and JP 03-225477 A, Oct. 4, 1991.
Patent Abstracts of Japan, vol. 016, No. 398, Aug. 24, 1992 and JP 04-130978 A, May 1, 1992.
Kazuo Yamaba et al: "Color Character Recognition Method Based on Human Perception", Optical Engineering, Soc. Of Photo-Optical Instrumentation Engineers, Bellingham, US, vol. 32, No. 1, 1993, pp. 33-40, XP000336027.

* cited by examiner

*Primary Examiner*—Brian Werner
*Assistant Examiner*—Eueng-nan Yeh
(74) *Attorney, Agent, or Firm*—Pearne & Gordon LLP

(57) ABSTRACT

An image processing method operates on a colored digitised image in a computer (2) to derive the image in abstract computer representation. Color is used to pre-classify symbols and other features of the digital image in order to simplify subsequent character recognition steps. By preparing the image in accordance with rules such that a unique color is used for all features of a defined set, and by storing those features in the computer in computer representation in corresponding sets, once a match has been made between a graphic feature and a stored feature, then the color of that graphic feature is made unique to the set of stored features containing the matched feature. The remaining graphic features of that color then need to be compared only with the stored features in the same set, rather than with all the stored features (of all the sets), thus significantly reducing the character recognition processing that is required to effect matching.

7 Claims, 2 Drawing Sheets

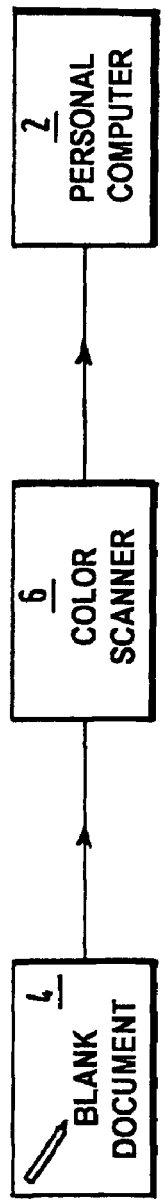

COLOUR CODE ASSISTED IMAGE MATCHING METHOD

Figure 3C:
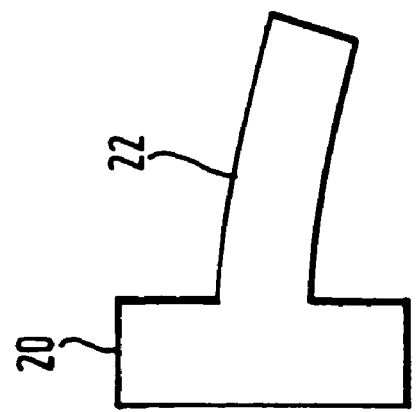

This application claims the benefit of International Application Number PCT/GB03/00081, which was published in English on Aug. 7, 2003.

The present invention relates to an image processing method, and in particular to a method of operating on a coloured digital image containing both symbols (such as numerals, characters, pictograms, icons etc) and other non-symbolic features (such as drawings, sketches, photographs, x-rays etc.)

In the present description, a distinction is made between symbols stored in a computer as images, that is as digital graphical representations of the symbol, and symbols stored in the computer in abstract or codified computer representations. Exemplary formats for digital graphical representations include bmp, jpeg and gif, and exemplary formats for abstract or codified representations of symbols include ASCII and Word for Windows formats for roman characters and Arabic numerals. The digital image may comprise symbolic and non-symbolic features.

It is known to use a colour scanner to scan a document of text, a drawing or a picture so as to derive a digital image in the computer (in any of a large number of formats such as bit mapped, gif, jpeg, etc). Where the digital image consist of text or other symbols, it is also known to apply optical character recognition software to that image so as to obtain an abstract computer representation of the symbols, so that standard software, such as a word processing programme, can operate on the codified computer representations of the symbols.

U.S. Pat. No. 4,853,878 (IBM) discloses a display technique that allows the user to input information to a computer in the form of colour with character text, whereby information can be conveyed to an application program by using colour to specify functions or attributes. Colours are used to reduce the number of interactions necessary to accomplish the task between the user and the application program. In many systems, a command has to be typed to save a file, for example, and the commands range in size from one to many characters and require the user to key in each character and the file name. In this invention, the display technique assigns a colour to data elements inputted into the system, and the colour is interpreted by the application to indicate what specific function, attribute or value should be associated with the data element. This allows the specific function etc. to be performed by the application program in the computer without the user having to make additional key strokes or input further character information.

U.S. Pat. No. 5,579,407 (Murez) discloses an optical character recognition system which can extract information from documents into machine-readable form for selected inclusion into a database, in which initial classification is carried out by the user applying colours by means of translucent highlighting ink pens, to provide correlation between the colours and the field designations. An optical scanner then reads the highlighted document and converts it to electronic data which is stored into database fields according to the colour marked regions.

These two US patents thus link colour to a function that is to be applied to a feature etc. The link between colour and function, attribute or field designation in a database, provided by these documents, is dependent on the correlation being pre-stored into the computer, so that when the scanner identifies a particular colour in the text, a one-to-one correlation is made between that colour as stored in the computer and the specific function, attribute or designation to be effected. Problems can arise with this form of matching, for example if the colour that is actually applied by the user to the source document does not correspond precisely enough with the colour that is pre-stored in the computer. In these circumstances, it may be difficult, if not impossible to effect the match, or an incorrect match may be made.

It is one object of the present invention to provide an improved method of operating on a digital image containing symbols which is stored in a computer to derive therefrom the symbols in an abstract computer representation or code rather than in a graphic digital form.

The present invention resides in the use of colour to pre-classify symbols and other features of a digital image in order to simplify subsequent character recognition steps. By preparing the image in accordance with rules such that a unique colour is used for all features of a defined set, and by storing those features in the computer in computer representation in corresponding sets, once a match has been made between a graphic feature and a stored feature, then the colour of that graphic feature is made unique to the set of stored features containing the matched feature. The remaining graphic features of that colour then need to be compared only with the stored features in the same set, rather than with all the stored features (of all the sets), thus significantly reducing the character recognition processing that is required to effect matching.

In accordance with one aspect of the present invention there is provided a method of operating on a coloured digitized image in a computer to derive therefrom the image, or at least portions thereof, in abstract computer representation, comprising the steps of:

(a) creating a digital image in a plurality of colours, with each colour representing an assigned set of features of the image;

(b) storing in the computer for each possible feature
  (i) one or more characteristic signatures of its graphical representation,
  (ii) its associated abstract computer representation, and
  (iii) the associated set to which the feature belongs;

(c) segmenting the digitized image from step (a) into its respective colours;

(d) selecting one feature of one of the segmented colours of step (c) and comparing the selected feature with each feature of each of the sets stored in the computer at step (b);

(e) identifying a match for the feature selected in step (d), and assigning to the set of stored features containing the matched feature the associated segmented colour;

(f) comparing each feature of the matched segmented colour of the digitized image with all the stored features of the associated segmented colour and identifying matches therebetween, thereby to derive for each feature in digitized graphic representation a respective matched feature in computer representation; and (g) repeating steps (d), (e), and (f) for other segmented colours, thereby to assign each colour to a respective one of the sets of features stored in the computer in computer representation and to match features of the digitized image with respective ones of the features stored in the computer.

Thus, what is stored in the computer in accordance with the method of the present invention are (i) prototypes or templates or other characteristic signatures of the graphic representation of all the symbols, for example many typical examples of the shape of the letter 'a' that may be encountered during the character recognition step, (ii) the associated computer code (in order that an abstract computer representation may be assigned once identified, for example the ascii code for the letter 'a'), and (iii) the set to which each symbol belongs (eg. the set of 'letters' for a,b,c etc., and the set of 'numerals' for 0,1,2 etc.)

It will be appreciated that at least one feature in each stored set of features must uniquely belong to that set, and that that feature must be present in the graphic representation in order that a colour may be assigned to each set. With this proviso, features with similar, or even identical, graphic representations can belong to two or more sets of features.

Thus, in the method of the present invention there is no requirement to pre-store a correlation between colour and the feature that is to be stored in computer representation. All that is required is that the user provides the features in the digital image in different, respective colours and always presents features of the same set in the same colour. The particular colour selected for each set is irrelevant. The stored features in the computer may represent the totality of those in the image, but are not initially correlated with the colours of the source image. Indeed, from one operation of the method to the next, the same set of features may be associated with a different colour. Upon each operation of the method, the computer itself will make an initial respective association between the sets and the colours. It is be to be appreciated, however, that not all stored features or features from each set will necessarily be found in any one given digital image representation.

Furthermore, in the present invention, and unlike in U.S. Pat. No. 485,878 and U.S. Pat. No. 5,579,407 for example, colour is not used to assign an extrinsic attribute (eg. save file, or place in Field 1) or to modify a feature, but is used to pre-classify features into different feature classes in order to assist and facilitate the pattern recognition process.

It is envisaged however, that the correlation between colours and sets of features, i.e. the assignment therebetween, may alternatively be pre-stored in the computer, thus further simplifying the character recognition process.

In the present invention it will be appreciated that the colours used for the sets of features in preparing the original digital image of the feature should be sufficiently distinct from one another, and be consistent from one feature to another of the same set, so as to avoid confusion when matching is made with the coloured sets of features stored in the computer in computer code.

It is to be noted that the use of distinct different colours in the present invention allows symbolic and/or non-symbolic features to be located adjacent one another, in abutment and even overlapping one another, whilst still allowing them to be positively differentiated and identified in the character recognition process.

It will be appreciated that once the assignation of one feature of a set to a colour has been made in step (e), the comparison that is carried out in step (f) no longer needs to be with all the sets of stored features, thus reducing the time needed to effect matching for subsequent ones of the features, as well as enhancing the reliability of the pattern recognition process since a selected feature needs only to be matched with a subset of all the features.

It is to be understood that the step of obtaining a match need not necessarily provide a 100% match, and the comparison carried out in step (d) and (f) may include steps of obtaining the best match, that is to say the highest probability of a match, between the compared features.

The comparison step carried out in step (d) may also involve comparison of more than one feature so as to establish a match, and thus reach the assignation of step (e), whereby more than one feature of the digital image may need to be compared with the stored set of features so as to obtain an acceptable match, thereby reducing the amount of pattern recognition processing that is required to be carried out, and enhancing the reliability of the matching.

When comparing features in step (d) of the method, it may be desirable to carry out comparisons of all the features of the digital image with each feature of all the stored sets before assigning colours to each stored set. By considering the degrees of matching obtained in this way, enhanced matching reliability is achieved when subsequently the colours are assigned to respective stored sets.

The sets of features of the image may be selected from the group including:
alphabetic characters (arabic and others);
numeric characters; and
arithmetic and other symbols.

These exemplary sets may be sub-divided. For example, there may be one set of alphabetic characters in plain script, another in italic script, and yet another in bold script—each set being represented in a distinct colour.

Furthermore, the colour coding of the graphic representation of the image will be effective to avoid ambiguities that could otherwise arise during the character recognition, between the letter O and the number 0, or between the letter l and the numeral 1, for example.

It is also envisaged that one set of features of the digital image, the non-symbolic features, may not have a set associated therewith stored in the computer, since those features may be of random shape, for example sketches. Provided sketches are prepared in a single, distinct colour, and that all the other sets of feature do have associated sets stored in the computer, then step (e) of the method will not be able to find a match for the un-assigned features, or will make a (best) match at a very low probability of certainty. Since matches, or at least significantly higher probability matches, will be made for the other sets, the computer is then able by a process of elimination, now with a high certainty, to assign the random set of features to the outstanding colour, thus associating all features of the graphic image with that colour as being the non-assigned set. Those features are then stored in a computer as digital graphic representations, rather than being replaced with abstract or codified representations. The use of colour differentiation in this way allows, for example, features of the graphic representation that touch or overlap to be isolated for character recognition purposes, for example symbols on the boundaries of a sketch.

The coloured digital image in graphic representation may be inputted directly into the computer by means of "paint" software, available as a standard simple application on many computers. Alternatively, a coloured image may be prepared, for example drawn manually, scanned by a colour scanner, and then inputted into the computer in order to provide the coloured digital image in graphic representation. Other forms of graphic representation may include a hand-drawn sketch, and a photograph, including an X-ray photograph. Furthermore, such an image may be annotated or amended in a different colour from the original, either manually or using a paint program, for example, to create the coloured image.

Figure 3B:
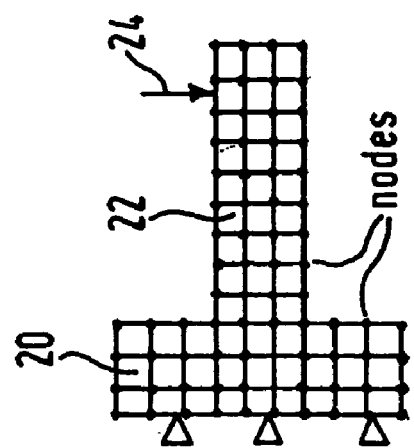
Figure 3A:
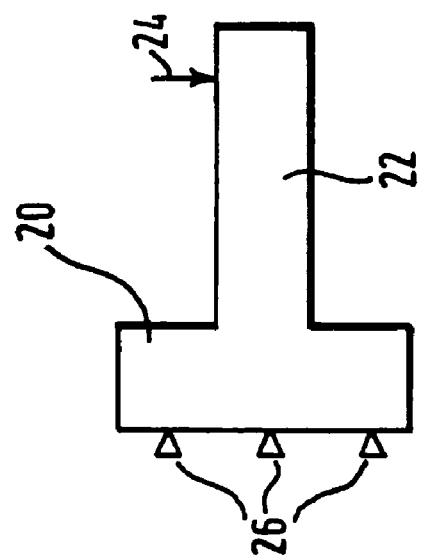

Various embodiments of the method of the present invention will now be described, by way of example, with reference to the accompanying drawings, in which:

FIG. 1 is a schematic representation of the operation carried out by the method; and FIGS. 2 and 3 are exemplary images used in describing the method.

Referring to FIG. 1, a personal computer 2 is provided with a standard "paint" software package and word processing package. It will be appreciated that by using the keyboard of the computer 2, text is inputted directly into the computer memory in computer representation by the normal operation of the word processing package. However, if the paint package is used then figures and text associated therewith are inputted and stored in the computer in graphic representation.

An image, text or drawing, can also be inputted into the computer 2 and displayed on the screen thereof, by having text and/or figures manually applied to a blank document 4, which is then scanned by a colour scanner 6 so as to provide the digital image in graphic representation in the computer 2. The features of the text or drawing that is thus obtained of a colour digital image in graphic representation in the computer 2 are inputted, either directly by use of a paint package, or by manual preparation of the document 4 and subsequent scanning by the device 6, are provided in different colours, with a one-to-one relationship between the different sets of features and the respective colours. The operating steps of the method of the present invention, as exemplified below, are then applied to that graphic representation so as to store in the computer the image in computer representation. A word processing package, for example, and then be used to operate on the computer representation.

FIG. 2 represents the sentence "Only 10 dogs were saved". The characters, or features, of this graphic image may be put into two sets, namely letters (in Arabic form) and digits. All of the members of those two sets, that is to say a to z and 0 to 9 respectively, are stored in a computer, but are not pre-assigned to any specific colours. When the user writes that sentence, it is to a rule that letters are to be presented in one colour, any colour, and digits are to be represented in any other colour. By way of example, it is assumed that the letters are entered in blue and the digits in red.

The present character recognition processing then considers the first feature that it encounters in the image, namely "O" and compares it with all of the features stored in the computer in both feature sets of letters and digits. In this case, since "O" may appear in both classes, namely as the letter O and as the digit 0, no conclusive, that is to say high probability, match can be made. It is to be noted that any potentially ambiguous feature of this kind is advisedly stored in the computer in different sets, so as to avoid a positive but incorrect match if it were stored in only one of the sets. This allows for the user presenting the feature in the original graphic representation in an other than perfect form.

In the event that no match, or no high probability, i.e. acceptable best match, can be made, the computer program is arranged to consider the second feature. In this example, the graphic "n" is considered, and a comparison is again sought with features of both sets of letters and stored in the computer. In this case, a match will be achieved. The computer program now assigns the match between the colour blue in which the graphic n was written, and the entire set of features of letters. Having done this, since the initial feature O was also in blue, the computer program can resolve the initial ambiguity, and can now assign O to the feature set of letters rather than to the set of digits. The computer program is then arranged to proceed in its comparison steps by considering all of the features that are in blue, and comparing them only with the stored features set of letters, obtaining matches therebetween.

The computer program is then arranged to consider the first feature of the next colour. In the example given this is the numeral 1 in red. Since in this simple example, there are only two colours and only two sets stored, the only comparison that has to be made is between the feature 1 and the set of digits, thus obtaining a match. Since the next (and final) unmatched feature, the digit 0 is also in red, the possible ambiguity with the letter O is already resolved, so that a match can now be obtained for the last feature of the graphic image.

In a more generalised example, where three or more colours are used in the original graphic representation, once an assignment has been made between one colour and one set of stored features, then equivalent steps may be made between the next coloured feature and the remaining sets of stored features to obtain colour assignment and matching.

It is thus seen that once a match has been made between the sets of features and the colours (blue=letters, and red=digits), then symbolic features subsequently need only be compared to features in the stored set of features in that colour. Furthermore, ambiguous features, such as the letter O and the digit 0, can be identified if they are in different feature sets. The alternative approach currently used for resolving ambiguities in identical or similar features is to look at contextual information. In this approach, and considering the present example, the fact that the letter O is followed by n, 1, and y which are clearly identifiable as letters, is used to assign the feature O to the set of letters. This contextual approach is more time consuming than that of the colours assignment of the present invention, and in certain circumstances may still not resolve ambiguities.

Having identified matches between the features of the graphic representation of the image and features stored in computer representation in the computer, an ASCII code may be assigned thereto.

FIG. 3 represents a digital image relevant to the structural analysis of a T-shaped structure of a vertical support bracket 20 and horizontal, cantilevered beam 22. In FIG. 3, (a) shows the initial paper sketch as prepared by the user, in which a load of 100N is represented by an arrow 24 in one colour, say red, and support for the bracket 20 is represented by arrow heads 26 representing boundary conditions in the same colour. The digits and letters 100 and N, giving the value of the load, are represented in a second colour, say blue. The bracket 20 and the beam 22, i.e. the drawing of the structural members, are in a third colour, say green. Thus, this graphic representation has three colours representing three sets of features, namely red for the set of loads and boundary conditions (point force, distributed loads, moments, pinned supports, clamped supports etc), blue for the set of digits and letters, and green for the set of drawings, pictures or sketches. It will be appreciated that although sets of features will be stored in the computer for the first two sets, there will be no stored features for the drawing set.

The initial sketch of the structure and associated symbols is imported directly using a colour scanner into a computer to provide the image in a digital representation. Operation of a computer programme on the digital image in accordance with the present invention is then effected resulting in the colour red being assigned to loads and boundary conditions, blue to the digits and letters, and green to structural members (drawing). It will be appreciated that for the third, green, set, there will be no matching, or the worst match will be obtained for the features in the drawing. The program can then mesh within the boundaries of the lines of the feature (sketch of T shaped structure) using any of a number of techniques—that is the structure is discretized into elements with nodes at the corners as shown in (b) of FIG. 3. Once meshed, the boundary conditions and loads are individually and sequentially identified (in this case three arrow heads and one arrow). The operators these represent (point supports and load) can then be applied to the nearest node (i.e. operators are stored in abstract computer representation for input into a finite element solver). Additionally for the load (arrow) the digits and characters (100N) closest to the arrow are identified and are associated with that operator, resulting in a computer representation of a vertical load of 100N acting on a particular node. Structural analysis can be carried out, for example as indicated in (c) of FIG. 3, and for example the maximum load that can be applied to the free end of the structure 22 whilst producing a deflection from the horizontal of not more than a given amount can be determined.

Thus, the operating method of the present invention requires only a simplified form to generate a finite element model of a loaded structure (pre-processor) for input into a finite element solver, as opposed to contemporary finite element pre-processors which require a substantial period of training and experience before they can be made generally useful.

Although the examples given have been with respect to text and a simple structural analysis, it is also envisaged that finite element models can be constructed in respect of fluid flow, electromagnetic effects, kinematic linkage and heat transfer, for example. By using colour to distinguish between various features, simpler software can then be applied to discriminate, identify and interpret the initial sketch of a user or the image produced by a standard paint package, and can be used without the need for extensive specialist training.

The invention claimed is:

1. A method of operating on a coloured digitised image in a computer to derive therefrom the image in abstract computer representation, comprising the steps of:
   (a) creating a digital image in a plurality of colours, with each colour representing an assigned set of features of the image;
   (b) storing in the computer for each possible feature
      (i) one or more characteristic signatures of its graphical representation,
      (ii) its associated abstract computer representation, and
      (iii) the associated set to which the feature belongs;
   (c) segmenting the digitised image from step (a) into its respective colours;
   (d) selecting one feature of one of the segmented colours of step (c) and comparing the selected feature with each feature of each of the sets stored in the computer at step (b);
   (e) identifying a match for the feature selected in step (d), and assigning to the set of stored features containing the matched feature the associated segmented colour;
   (f) comparing each feature of the matched segmented colour of the digitised image with all the stored features of the associated segmented colour color and identifying matches therebetween, thereby to derive for each feature in digitised graphic representation a respective matched feature in computer representation; and
   (g) repeating steps (d), (e) and (f) for other segmented colours, thereby to assign each colour to a respective one of the sets of features stored in the computer in computer representation and to match features of the digitised image with respective ones of the features stored in the computer.

2. A method according to claim 1, wherein the matching obtained in step (e) comprises the best match between a selected feature of the digital image and the stored features in abstract computer representation.

3. A method according to claim 1, wherein the digital image contains one set of features in one, and only one, more colour than the number of assigned sets stored in the computer in step (b), whereby for said coloured set of features no match is obtainable in step (e), and no derivation is effected in step (f).

4. A method according to claim 3, wherein the non-assigned set of features comprises sketches.

5. A method according to claim 1, wherein the sets of features comprise letters, digits, icons or symbols.

6. A method according to claim 1, wherein the digital image is inputted into the computer by means of 'paint' software.

7. A method according to claim 1, wherein a coloured image is drawn manually, is scanned by a colour scanner, and is the stored in the computer as the digital image.

* * * * *